United States Patent
Chen et al.

(10) Patent No.: US 6,906,894 B2
(45) Date of Patent: Jun. 14, 2005

(54) WRITE HEAD HAVING A RECESSED, MAGNETIC ADJUNCT POLE FORMED ATOP A MAIN POLE, AND METHOD OF MAKING THE SAME

(75) Inventors: Yingjian Chen, Fremont, CA (US); Xiaozhong Dang, Fremont, CA (US); Francis H. Liu, Fremont, CA (US); Kroum Stoev, Fremont, CA (US); Hai Jiang, Fremont, CA (US); Yugang Wang, Milpitas, CA (US); Xizeng Shi, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/903,977

(22) Filed: Jul. 29, 2004

(65) Prior Publication Data

US 2005/0007696 A1 Jan. 13, 2005

Related U.S. Application Data (63) Continuation of application No. 09/952,989, filed on Sep. 14, 2001, now Pat. No. 6,791,793.

(51) Int. Cl.$^7$ .................... G11B 5/147; G11B 5/127
(52) U.S. Cl. ............... 360/126; 360/123; 360/125; 360/317; 29/603.08; 29/603.14
(58) Field of Search .................. 360/123, 125–126; 29/603.08, 603.14

(56) References Cited

U.S. PATENT DOCUMENTS

| | | | | |
|---|---|---|---|---|
| 6,111,724 A | * | 8/2000 | Santini ............... | 360/126 |
| 6,466,401 B1 | * | 10/2002 | Hong et al. ........... | 360/123 |
| 6,469,874 B1 | * | 10/2002 | Han et al. ............ | 360/317 |
| 6,490,125 B1 | * | 12/2002 | Barr .................. | 360/126 |
| 6,504,676 B1 | * | 1/2003 | Hiner et al. .......... | 360/126 |
| 6,591,480 B1 | * | 7/2003 | Chen et al. .......... | 29/603.14 |

* cited by examiner

Primary Examiner—George Letscher
(74) Attorney, Agent, or Firm—Samuel A. Kassatly, Esq.

(57) ABSTRACT

A read/write head and method of making the same are used in a data storage system, such as a disk drive, for perpendicular magnetic recording of data. The head employs a two-layer pole design with a main pole made of sputtered high moment magnetic material, and an adjunct pole made of electroplated soft magnetic film. The main pole is used to write data onto the medium, and is formed over the write coil. The adjunct pole is substantially recessed from the air bearing surface and is formed over the main pole. The present head design significantly enhances the magnetic write field, and substantially reduces side-writing that result in accidental erasure of data in adjacent tracks on the magnetic recording medium.

19 Claims, 10 Drawing Sheets

WRITE HEAD HAVING A RECESSED, MAGNETIC ADJUNCT POLE FORMED ATOP A MAIN POLE, AND METHOD OF MAKING THE SAME

PRIORITY CLAIM

The present application claims the priority of, and is a continuation application of U.S. patent application titled "Perpendicular Recording Write Head Having a Recessed, Magnetic Adjunct Pole, and Method of Making the Same," Ser. No. 09/952,989, filed Sep. 14, 2001 U.S. Pat. No. 6,791,793, which is incorporated herein by reference.

FIELD OF THE INVENTION

The present invention relates in general to data storage systems such as disk drives, and method of making the same. It particularly relates to a thin film read/write head for use in such data storage systems. More specifically, the present invention discloses an enhanced design of a thin film, inductive type write head for perpendicular magnetic recording. The write head employs a two-layer pole design with the main pole made of sputtered high moment magnetic material and the adjunct pole made of electroplated soft magnetic film and substantially recessed from the air bearing surface. This new design significantly enhances the magnetic write field, and substantially reduces side-writing that could result in accidental erasure of data in adjacent tracks on the magnetic recording medium.

BACKGROUND OF THE INVENTION

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

In the current magnetic storage technology, thin film, inductive write heads typically fall under two categories: longitudinal recording heads and perpendicular recording heads. Until recently, longitudinal recording heads have preceded perpendicular recording heads. As the continual push for very high density storage media has been the established trend in this field of technology, perpendicular recording heads have gained increasing acceptance owing to the ability of the perpendicular recording heads to provide more efficient recording methods for high-density storage applications than the longitudinal recording heads.

A perpendicular recording head is functionally distinguishable from a longitudinal recording head in the direction of the magnetic flux orientation with respect to the media such as a magnetic disk. During a write operation to a target track, the perpendicular recording head directs the magnetic flux substantially normal to the surface of the magnetic disk. This normal orientation is also the anisotropy direction of the media. In contrast, the magnetic flux developed by the longitudinal recording head is generally in the plane of the surface of the magnetic disk.

Figure 3A:
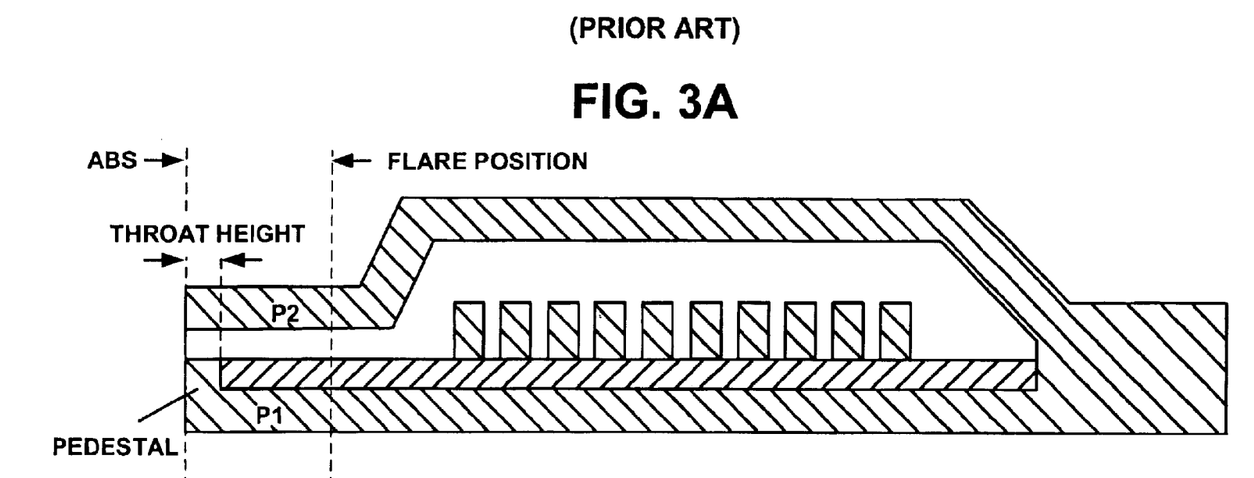
FIG. 3A is side, cross-sectional view of a longitudinal write head of a conventional design.
Figure 3B:
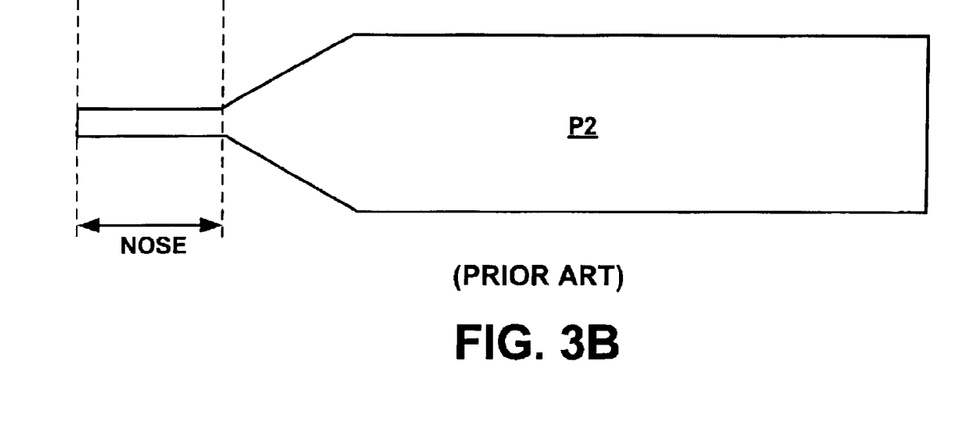
FIG. 3B is a top plan view of the write head of FIG. 3A.

Further exemplary differences in the features of the two types of thin film, inductive write heads can be summarized as follows:

Longitudinal write heads typically employ a ring head configuration that is comprised of two magnetic poles separated by a narrow gap in between, to optimize the magnetic field in the longitudinal direction. Referring to FIG. 3 (FIGS. 3A, 3B), an exemplary longitudinal write head typically includes a thin film write head with a bottom pole (P1) and a top pole (P2).

The pole P1 has a pole tip height dimension commonly referred to as "throat height". In a finished write head, the throat height is measured between an air bearing surface ("ABS"), formed by lapping and polishing the pole tip, and a zero throat level where the pole tip of the write head transitions to a back region. The pole tip region is defined as the region between the ABS and the zero throat level. This region is also known as a pedestal, which is an extension of the pole P1.

Similarly, the pole P2 has a pole tip height dimension commonly referred to as "nose length". In a finished write head, the nose is defined as the region of the pole P2 between the ABS and the "flare position" where the pole tip transitions to a back region.

Each of the poles P1 and P2 has a pole tip located in the pole tip region. The tip regions of the poles P1 and P2 are separated by a magnetic recording gap, which is a thin layer of insulation material. During a write operation, the magnetic field generated by the pole P1, channels the magnetic flux from the pole P1 to the pole P2 through an intermediary magnetic disk, thereby causing the digital data to be recorded onto the magnetic disk.

The magnetic flux immediately originated from the pole P1 and directed towards the pole P2 is substantially parallel with respect to the surface of the magnetic disk. This portion of the magnetic field is typically considered as a fringe field, which is responsible for the write operation of a longitudinal write head.

In the current magnetic storage technology, longitudinal magnetic recording is considered to have reached a thermal stability limit beyond which no significant increase in the areal density of magnetic media for use with longitudinal write heads could be achieved. This is due to the reduced thickness of the magnetic media in order to achieve reduced transition width as necessitated by the increase in the areal density. The transition width is the distance over which the magnetization of the stored bits changes.

In addition, since the signal-to-noise ratio is proportional to the number of grains in the bit volume, the grain size needs to be reduced as the bit volume becomes smaller. This poses a severe problem of thermal instability for the magnetization of the magnetic grain.

To address the aforementioned problems and the continual technological push for higher density magnetic storage devices, perpendicular write heads have become increasingly desirable. Specifically, the demagnetization field in a perpendicularly written bit tends to enhance the stability of neighboring bits. As a result, narrower transitions can be recorded in the perpendicular recording mode. The magnetic media used with perpendicular recording heads can be made thicker, and thus can have higher thermal stability than those used with longitudinal recording heads. The use of a soft underlayer can enhance the perpendicular or normal component of the magnetic field and field gradient generated by the perpendicular write head.

To accomplish this objective, the soft underlayer, which is deposited beneath a recording layer, is made of a high moment magnetic material. During a write operation, any magnetic flux approaching the soft underlayer from the write pole in effect creates a virtual image of the write pole, thereby enabling a much higher magnetic write field and sharper field gradient.

Practically, perpendicular write heads could be constructed by appropriate modification of conventional longitudinal write heads. Using this derivative technology, an exemplary perpendicular write head may still use a ring head configuration of a conventional longitudinal write head with two magnetic poles, similarly referred to as P1 and P2.

Figure 4:
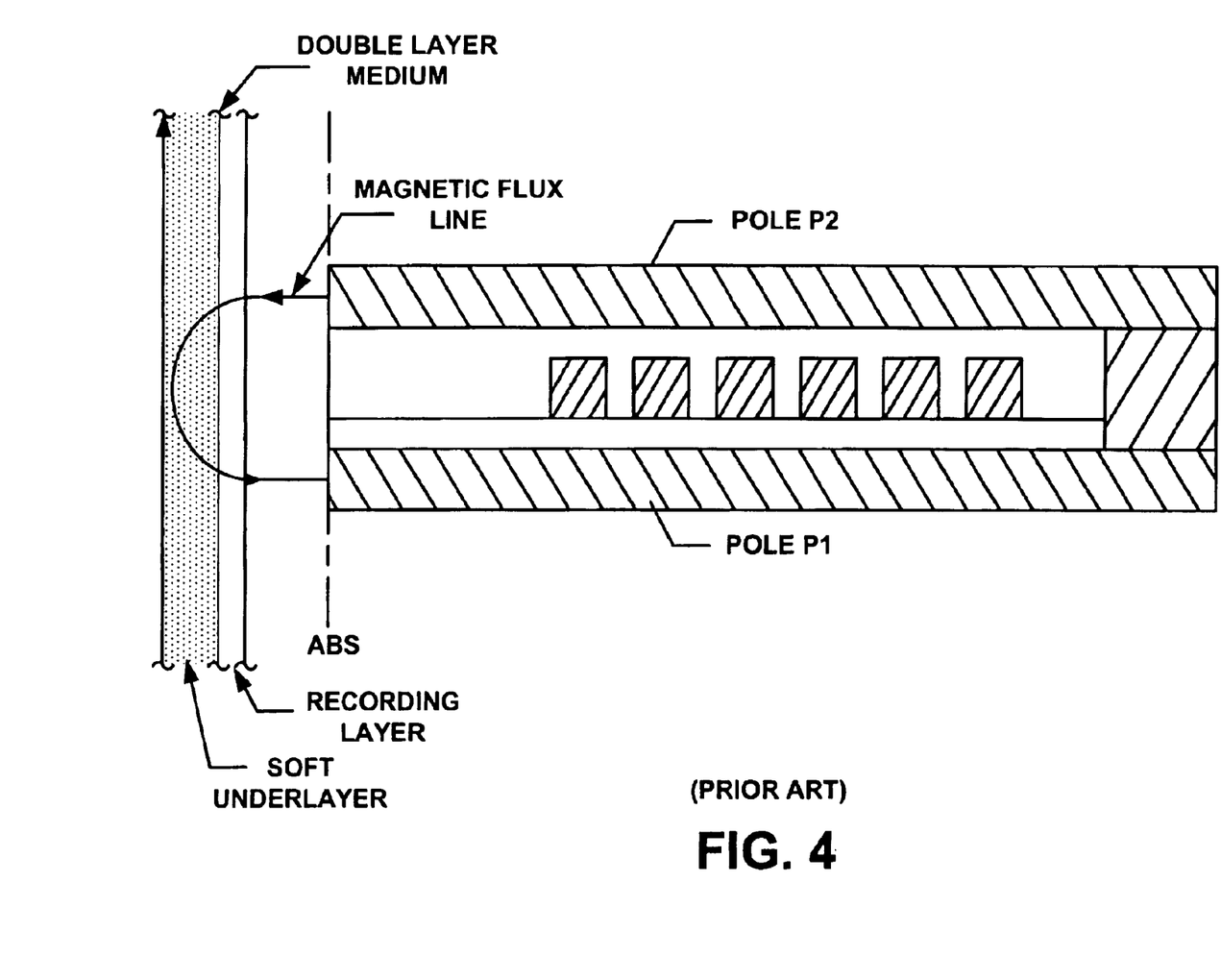
FIG. 4 is a cross-sectional view of a perpendicular write head of a conventional design, shown positioned relative to a data storage medium with magnetic flux action.

Referring to FIG. 4, a significant feature of a perpendicular write head that substantially departs from a conventional longitudinal write head, is the large distance between poles P1 and P2. A narrow gap between poles P1 and P2 is essential in longitudinal write heads but are not needed in perpendicular write heads. This is so because the most optimal configuration of a perpendicular write head usually is a single pole design.

Thus, in the exemplary perpendicular write head of FIG. 4, the pole P2 would be considered as the write pole responsible for generating the magnetic flux in the perpendicular direction during a write operation. The magnetic flux permeates into the magnetic medium for use with perpendicular write heads to enable a recording of digital data onto the magnetic disk. The pole P1 provides a return path for the magnetic flux.

The continual demand for a high areal density design of magnetic storage media has necessitated a reduction in the track width as a means to increase the track density without significantly altering the geometry of the storage medium. As the track width is reduced, a significant concern with a conventional perpendicular write head design arises.

Figure 5:
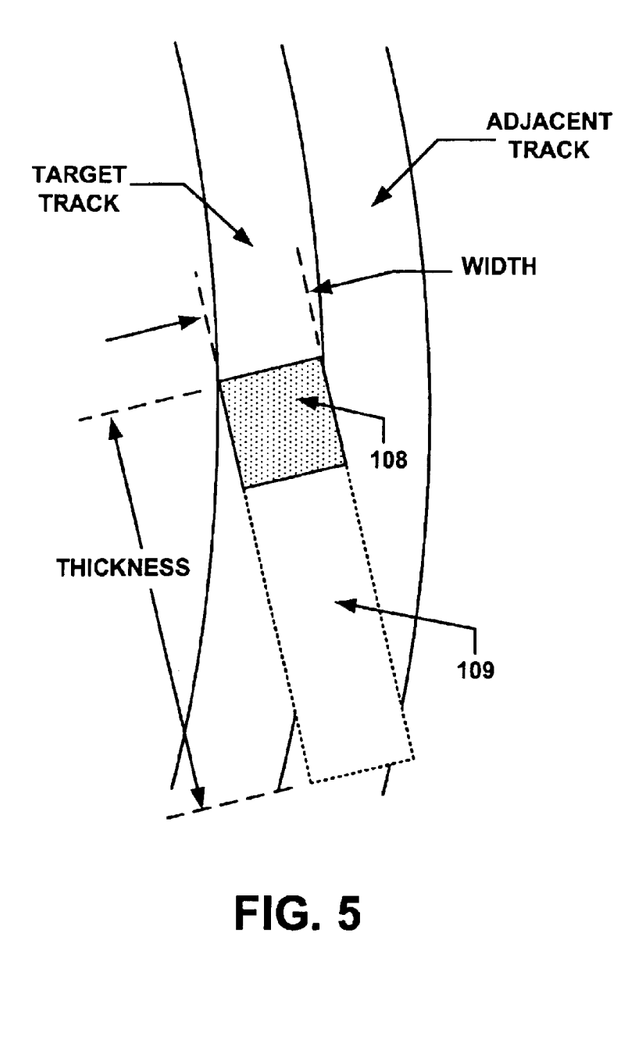
FIG. 5 is a comparative illustration of the side-writing process of the conventional perpendicular write head of FIG. 4, and of the perpendicular write head of the present invention (FIG. 6)

Referring now to FIG. 5, the pole tip 109 (shown in dotted line) of the pole P2 of a conventional perpendicular write head typically is of a rectangular shape (or footprint) that is defined by a width and a thickness, as viewed from the air bearing surface (ABS). The width of the pole P2 tip is referred to as the track width, and the thickness of the pole P2 tip is typically much greater than the track width.

During a write operation, the pole P2 tip imposes onto a target data track of the magnetic disk a magnetically active area of the size of the physical area of the pole P2 tip. Because the data tracks are generally concentric, but the pole P2 tip is rectangular, only a part of the magnetically active area is properly focused onto the target track, while the remaining magnetically active area is actually focused (i.e., skewed) onto the adjacent tracks, thereby causing a disturbance of the previously recorded bit.

This phenomenon is also referred to as side-writing. The side-writing action may, in a worst case scenario, result in an accidental, complete erasure of data in these adjacent tracks. Thus, without data verification and correction in between each write operation, the data quality of a magnetic disk could be significantly compromised.

Still, another significant concern with a conventional perpendicular write head design lies in the less than optimal performance of the write pole P2 due to the material characteristics of the pole P2. In a conventional perpendicular write head, the pole P2 is made of conventional electroplated magnetic materials such as NiFe or CoNiFe in accordance with the longitudinal write head technology from which conventional perpendicular write head design is derived.

While the conventional electroplated magnetic material is sufficient in longitudinal write head design utilizing two write poles, it is deemed inadequate for a single write pole design in conventional perpendicular write heads. Because of the single write pole design, the conventional magnetic material does not demonstrate sufficiently high degrees of magnetic moment, permeability, and other desirable properties to generate enough magnetic field strength to achieve an optimal data recording.

Thus, in light of the foregoing problems, there is still an unsatisfied need for a technologically more efficient design of perpendicular write heads. This design should resolve the long standing issue of data erasure in adjacent tracks due to side-writing, while also addressing the need for enhancing the magnetic write field strength without compromising the manufacturability of perpendicular write heads.

SUMMARY OF THE INVENTION

It is a feature of the present invention to provide a new thin film, inductive perpendicular write head architecture for an enhanced magnetic write field and for the elimination of side-writing that could result in accidental data erasure in adjacent tracks.

The foregoing and other features and advantages of the present invention are realized by a perpendicular write head architecture that incorporates a single pole write element. The write head includes a first pole (P1) made of a magnetically conductive material, that provides a return path for a magnetic flux during a write operation onto a medium. An inductive write coil is disposed atop the first pole (P1), and a main pole is formed over the write coil and extends to an air bearing surface (ABS) level. An adjunct pole is made of a thin film magnetically conductive material and is formed atop the main pole. The adjunct pole is recessed from the air bearing surface (ABS) level, for the purpose of enhancing the magnetic write field, while ensuring the absence of side-writing and linear recording density.

The main pole responsible for data recording is preferably made of sputtered high moment magnetic material of approximately 0.1 $\mu$m–0.7 $\mu$m in thickness. The adjunct portion of the main pole is preferably made of electroplated soft magnetic material.

The perpendicular write head design of the present invention offers several performance and manufacturing advantages, such as a higher magnetic write field and a higher field gradient than those generated in conventional longitudinal write heads, reduced sensitivity to fly height, easy implementation of sputtered high moment magnetic material deposition, and superior overwrite and NLTS (Non-Linear Transition Shift) performance. The perpendicular write head design of the present invention can be used in a read/write head employed for perpendicular recording for high areal density of, for example 100 Gb/in$^2$.

BRIEF DESCRIPTION OF THE DRAWINGS

The features of the present invention and the manner of attaining them, will become apparent, and the invention itself will be understood by reference to the following description and the accompanying drawings, wherein:

FIG. 3 is comprised of FIGS. 3A and 3B, where

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
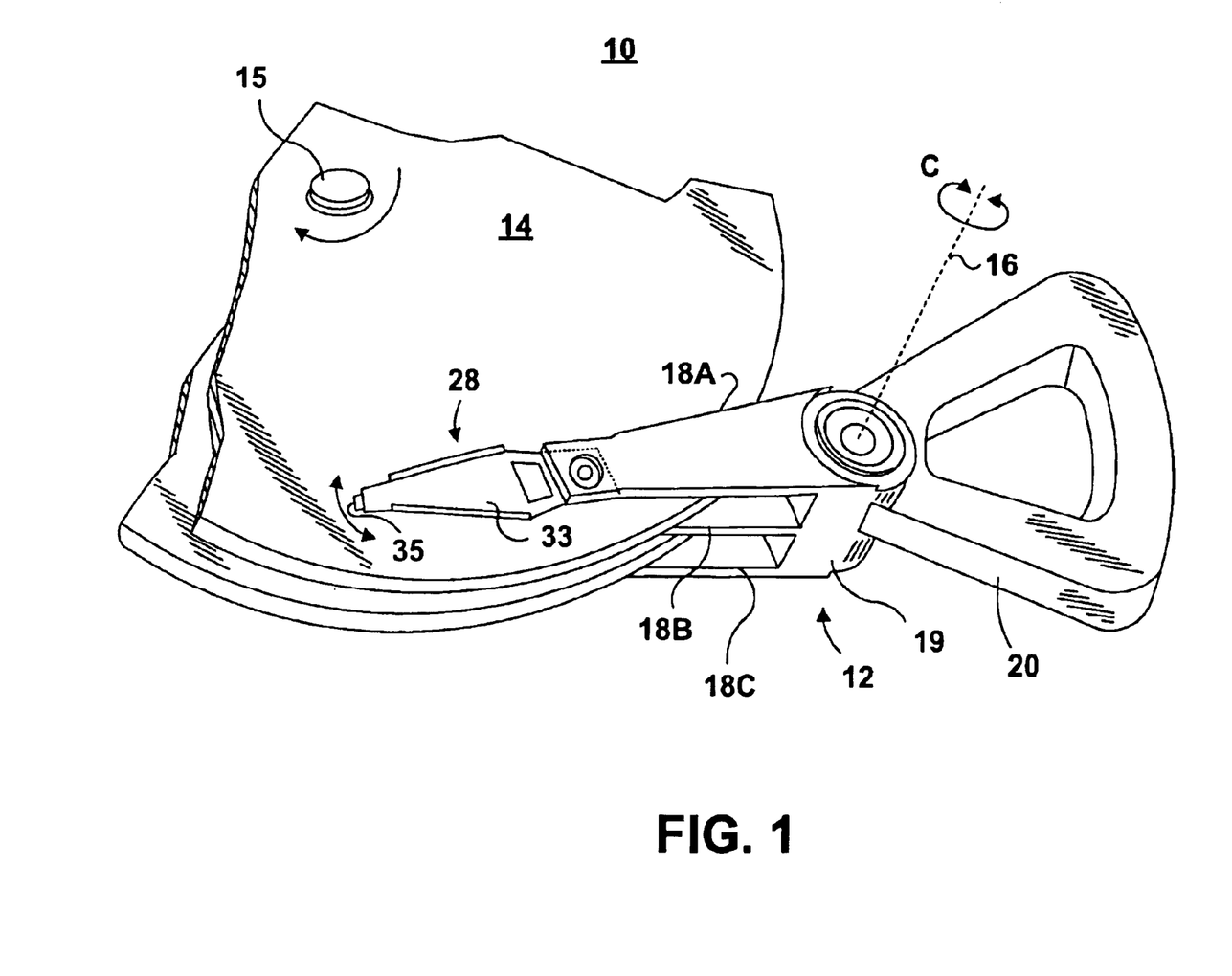
FIG. 1 is a fragmentary, perspective view of a data storage system utilizing a read/write head of the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
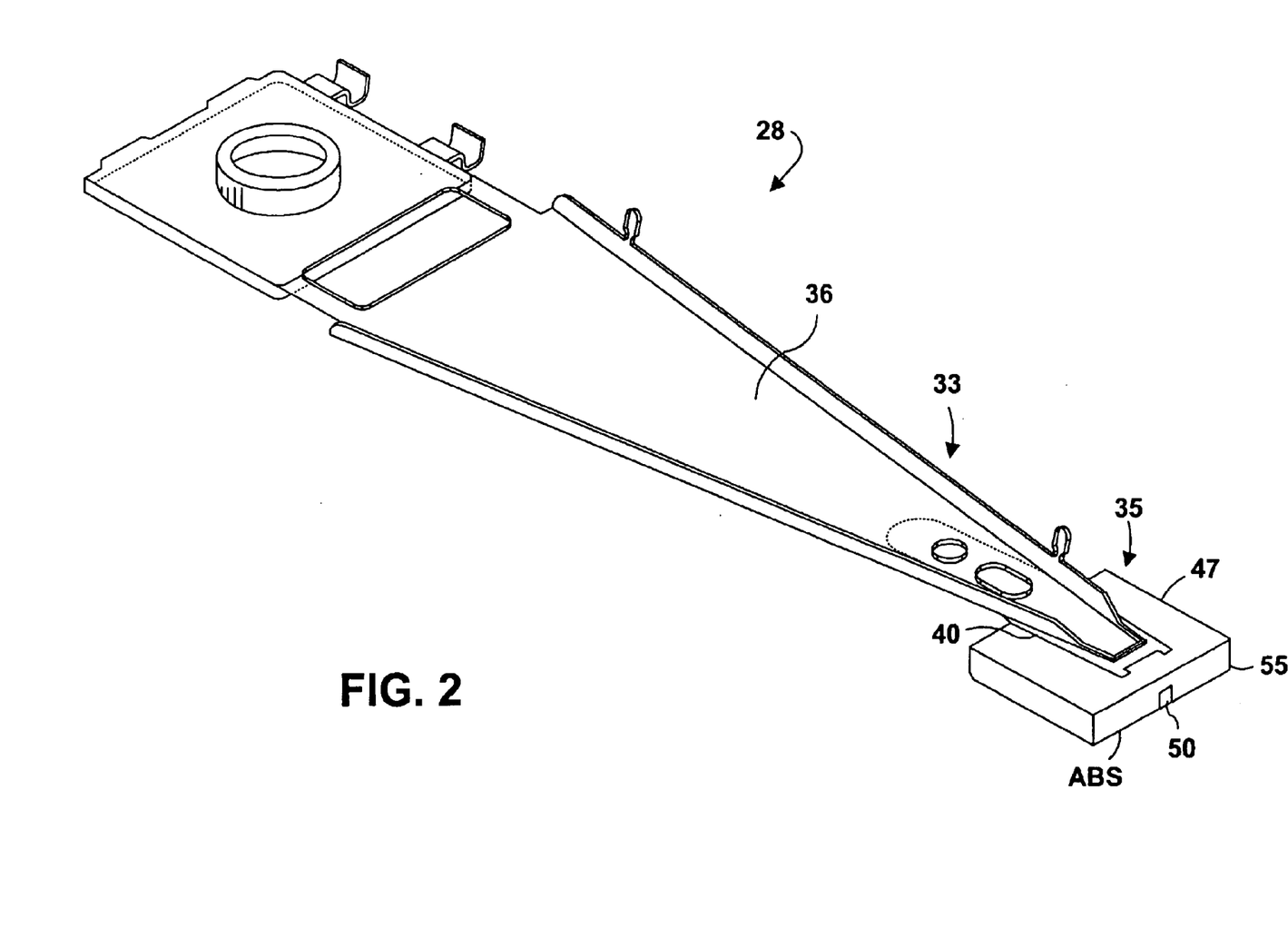
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40, and a read/write element 50 supported by the slider 47.

With reference to FIG. 2, the read/write element 50 is mounted at the trailing edge 55 of the slider 47 so that its forwardmost tip is generally flush with the ABS of the slider 47. The slider 47 can be any conventional or available slider. In another embodiment according to the present invention, more than one read/write element 50 can be secured to the trailing edge 55 or other side(s) of the slider 47.

Figure 6:
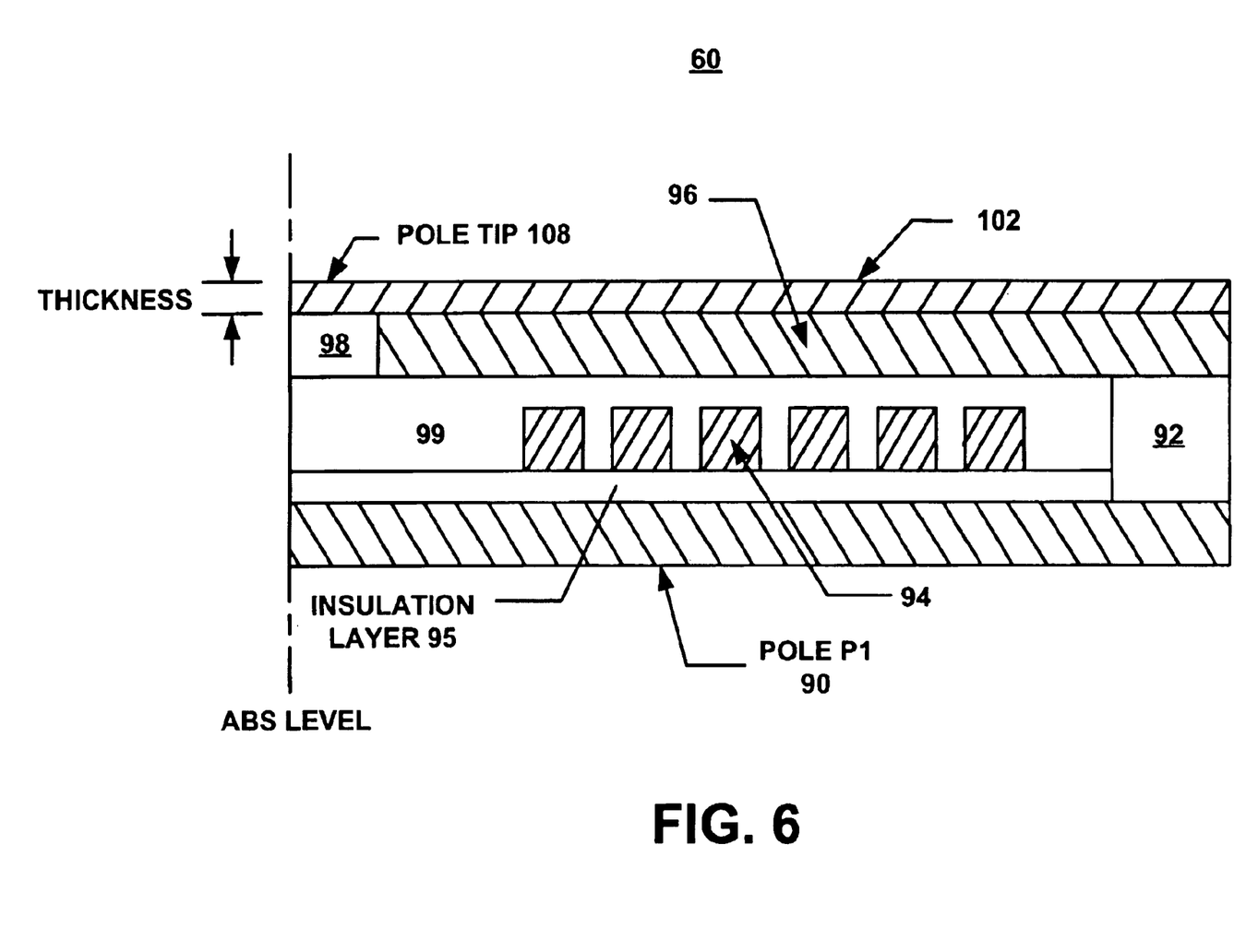
FIG. 6 is a cross-sectional view of the perpendicular write head made according to a preferred embodiment of the present invention.

With reference to FIG. 6, the perpendicular write head 60 of the read/write element 50 made according to the present invention in a preferred embodiment is comprised of a first pole layer or the bottom pole P1 (also referenced by the numeral 90) that extends from the ABS level to the back gap 92. The bottom pole P1 is preferably made of a magnetically conductive material, such as NiFe or CoNiFe alloys. The bottom pole P1 (90) provides the return path for the magnetic flux during a write operation onto the magnetic disk 14.

The perpendicular write head 60 further includes a write coil 94 that is formed of a plurality of single-layered or multi-layered conductive coil elements (or conductors) 94A. Only a few exemplary coil elements 94A are illustrated in FIG. 6. The coil elements 94A are formed over an insulation layer 95. The write coil 94 can have one, two, four, or more turns as required, to generate the desired write field. The front portion of the write coil 94 resides in between the ABS level and the backgap 92.

The back gap 92 is located behind the write coil 94, and is preferably made of a magnetically conductive material, such as NiFe or CoNiFe alloys. The back gap 92 connects the pole P1 (90) to a second pole layer or adjunct pole 96, in order to provide a flow path for the magnetic flux.

The adjunct pole 96 is preferably made of soft, thin films of magnetically conductive materials, such as NiFe or CoNiFe alloys. In a preferred embodiment of the write head 60, the adjunct pole layer 96 is formed over the write coil 94. The thickness of the adjunct pole layer 96 can be substantially the same as, or similar to that of the bottom pole P1 (90).

An important feature of the present write head (60) design, is that the adjunct pole 96 is substantially recessed from the ABS level by a distance of for example, approximately 0.5 $\mu$m to 2.0 $\mu$m. The recess 98 is designed to provide an optimal balance between the enhanced magnetic field strength which requires a large volume of the adjunct pole 96, and the significant reduction or elimination of side-writing which, on the other hand, requires the tip of the adjunct pole 96 to be located further backward. The adjunct pole 96 helps carry the magnetic flux to the pole tip 108, while substantially reducing side-writing.

Yet another distinctive feature of the write head 60 is the addition of a third pole or main pole 102. The main pole 102 is responsible for writing digital data onto the magnetic disk 14. In a preferred embodiment, the main pole 102 is formed over the adjunct pole 96.

In order to enhance the performance of the write head 60, the main pole 102 is made of sputtered high moment magnetic materials, and has its thickness ranging, for example, from approximately 0.1 $\mu$m to 0.7 $\mu$m. A small pole thickness is desirable for high linear density in perpendicular recording mode.

The sputtered high moment magnetic materials can be a single layer or laminated FeXN (where X=Rh, Ta, Al, Ti, Zr, etc.), CoFeN, CoFeXN, or CoNiFeX films. The magnetic moment Bs for FeXN typically ranges between 19 to 25 kGauss. The sputtered high moment magnetic materials typically have advantageous characteristics compared to the conventional electroplated NiFe or CoNiFe material, such as higher moment, high permeability, lower eddy current loss at higher frequencies, and improved corrosion resistance.

The resulting magnetic field strength due to the main pole 102 can be greater than, for example, 2.3 Teslas, compared to the magnetic field strength of, for example 1.0 to 1.7 Teslas of a conventional top pole P2 (FIG. 4). During a write operation, the adjunct pole 96 cooperates magnetically with the main pole 102 to conduct sufficient magnetic flux to the pole tip 108.

Figure 8:
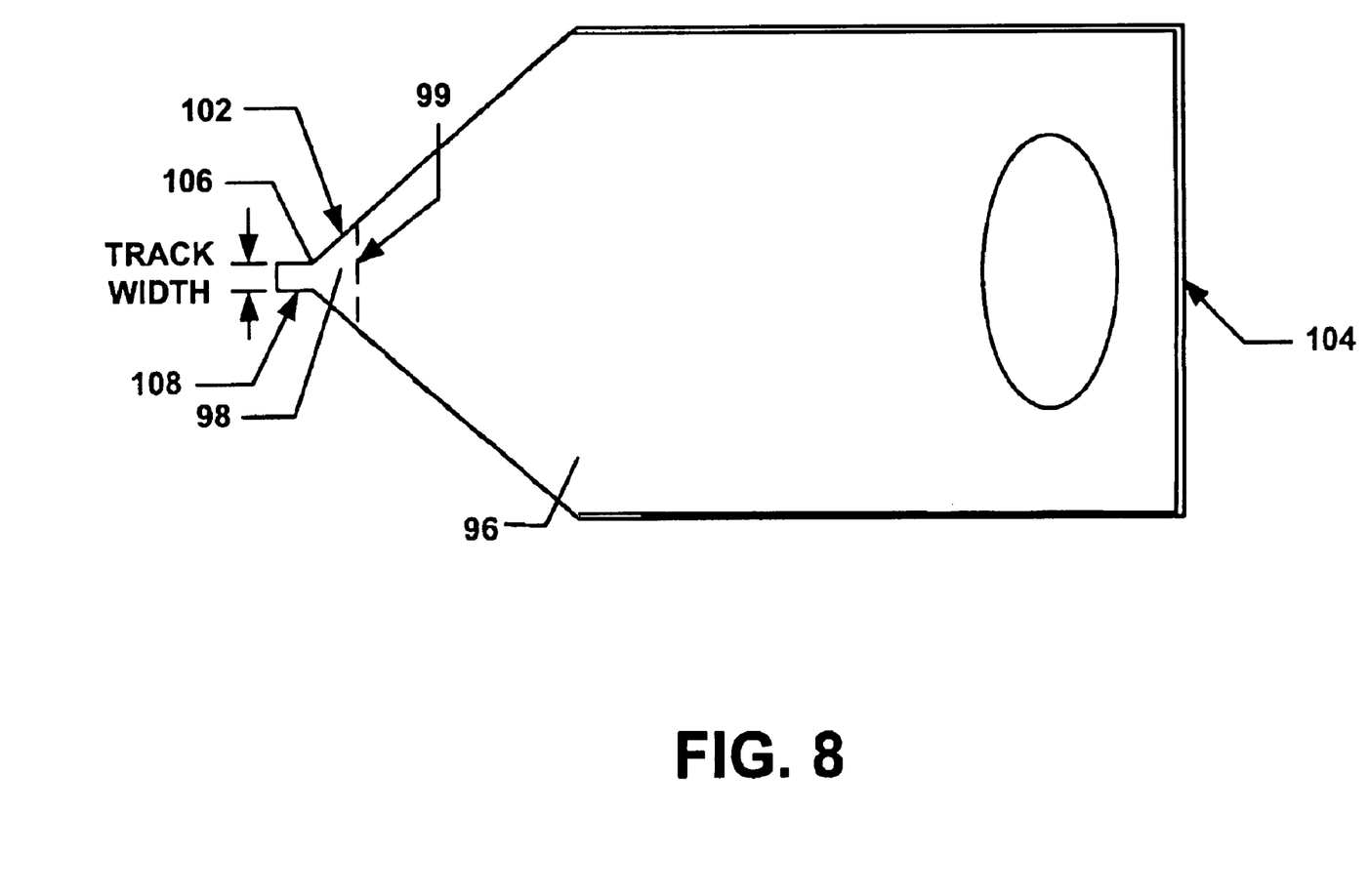
FIG. 8 is a top plan view of the main pole of the perpendicular write head of FIGS. 6 or 7.

With reference to FIG. 8, the main pole 102 is disposed across the rearward surface of the adjunct pole 96 (shown in dashed lines). The mail pole 102 has substantially the same footprint as that of the adjunct pole 96, between a back edge 104 and a forward edge of the adjunct pole 96, which defines the recess 98.

The flare position 106 of the main pole 102 extends forward of the recess 98. The tip 108 of the main pole is located forward of the flare position 106, and extends from the flare position to the ABS level, which, in this embodiment, is the same height from the ABS level to the tip of the bottom pole P1.

With reference to FIG. 5, the preferred footprint of the tip 108 of the main pole 106 is generally square, and is defined by four generally equal sides. Each side of the main pole tip 108 is substantially equal to the track width. The square footprint of the main pole tip 108 enables the magnetic flux generated therefrom to be substantially confined to the target track, without causing undesirable side-writing on the adjacent tracks during a write operation. It should be understood that in alternative embodiments, the footprint of the main pole tip 108 could also assume a different shape.

Figure 7:
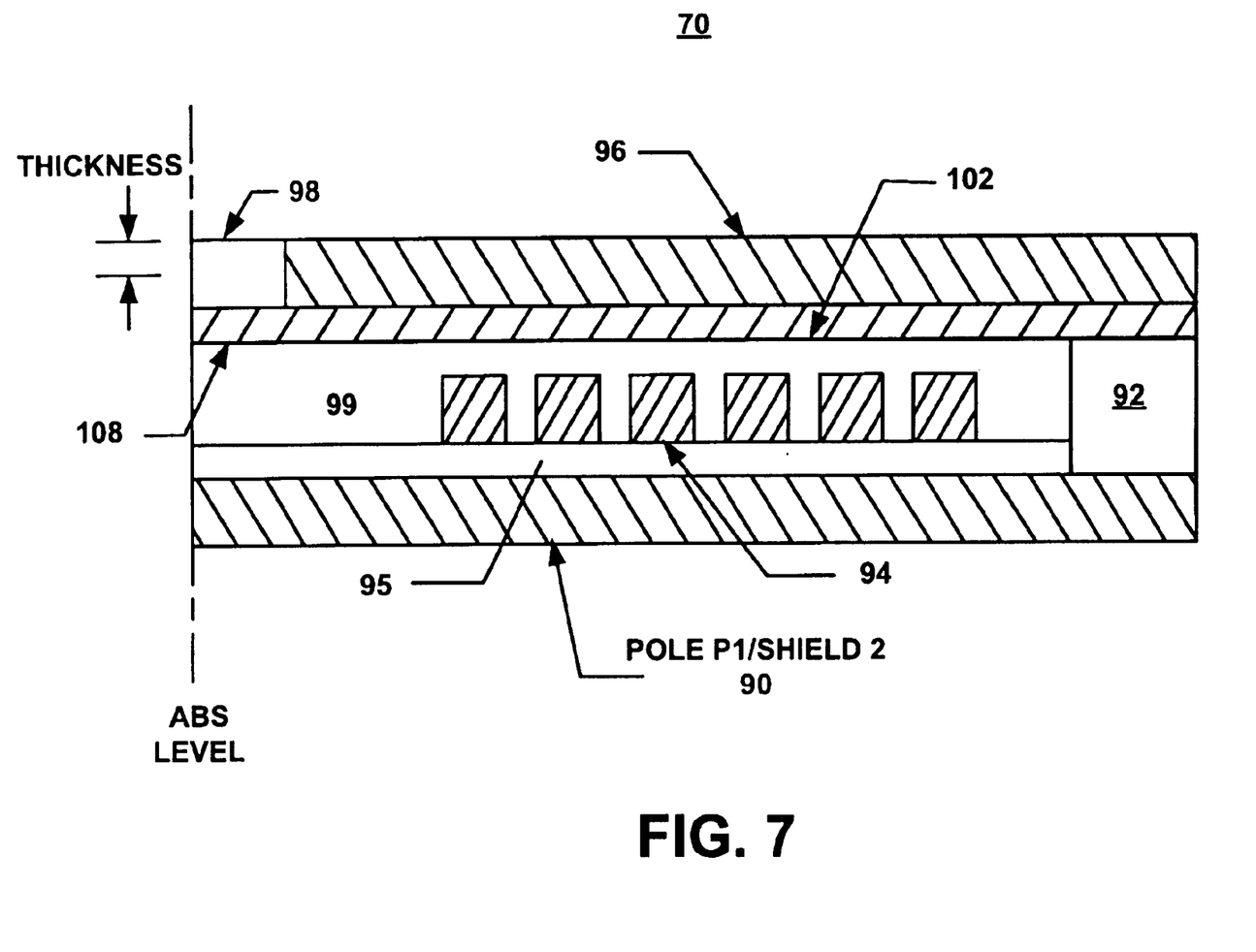
FIG. 7 is a cross-sectional view of a perpendicular write head made according to an alternative embodiment of the present invention.

FIG. 7 illustrates an alternate write head 70, where the positions of the main pole 102 and the adjunct pole 96 are reversed, compared to the preferred embodiment of FIG. 6. In this alternative embodiment, the main pole 102 is formed over the write coil 94, and the adjunct pole 96 is formed over the main pole 102 and defines a recess 98 as described earlier in connection with FIG. 6.

Figure 9:
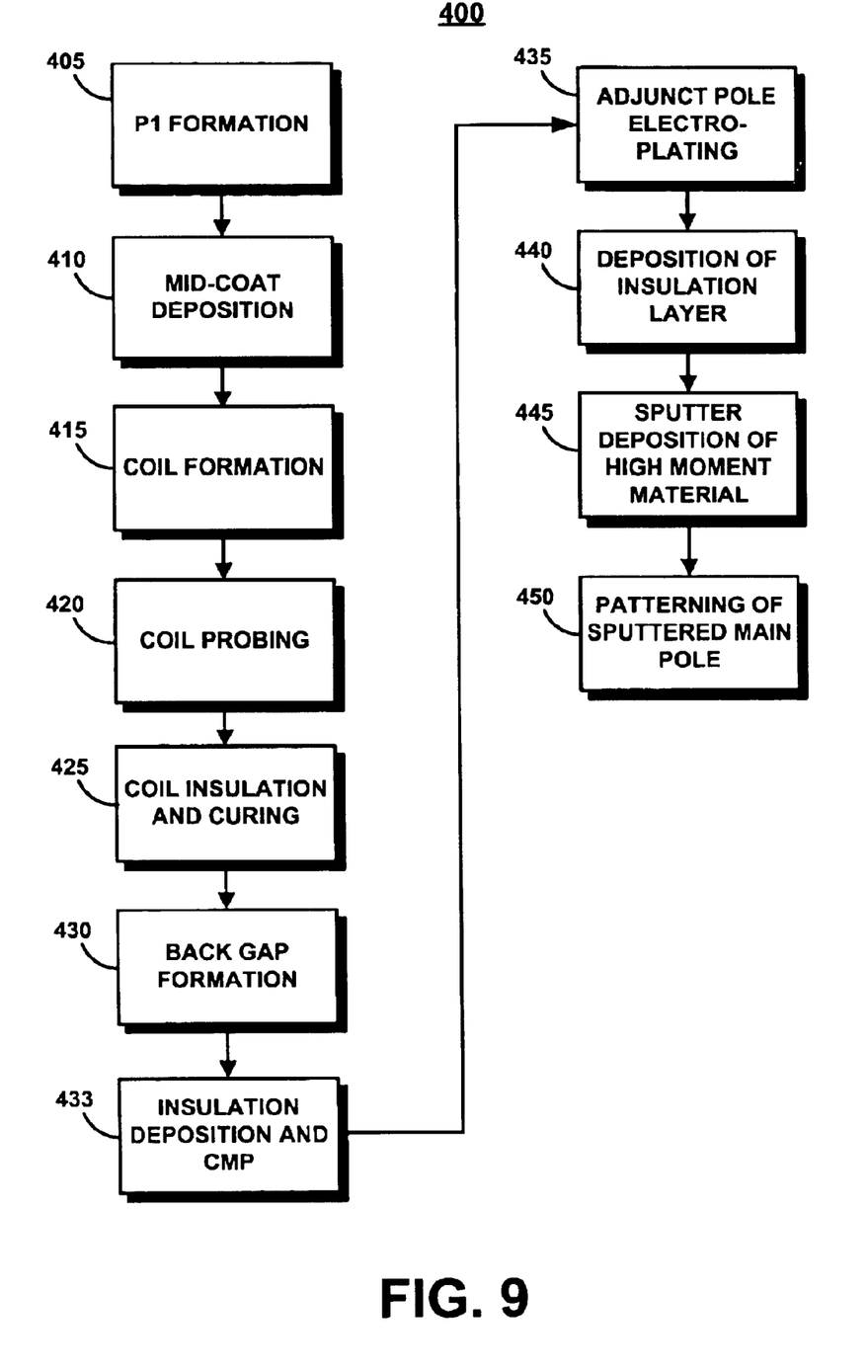
FIG. 9 is a flow chart that illustrates a method of making the write head of FIG. 6.
Figure 10:
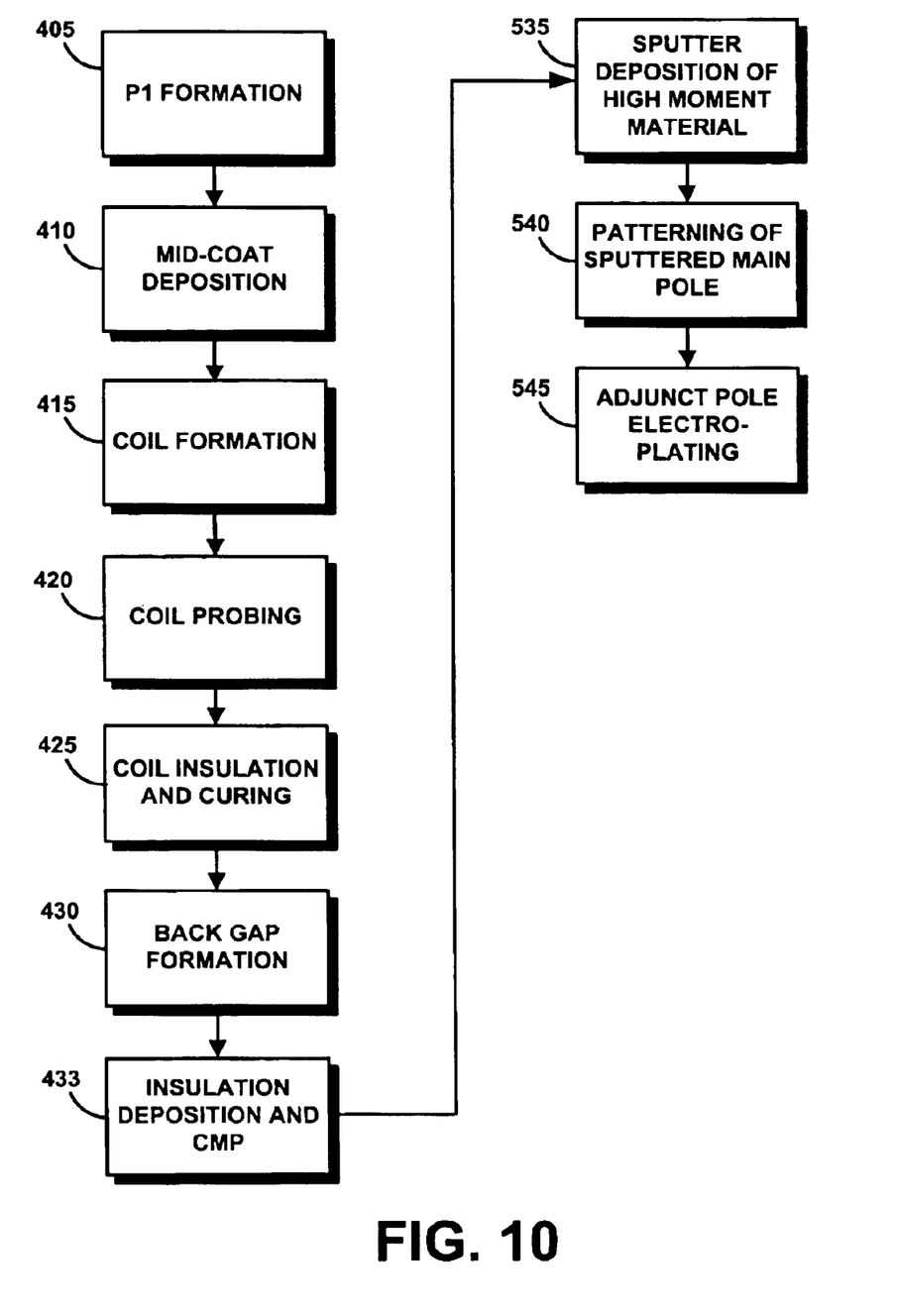
FIG. 10 is a flow chart that illustrates a method of making the write head of FIG. 7.

The methods of making the write heads 60 of FIGS. 6 and 7 are illustrated in FIGS. 9 and 10, respectively. The method 400 for making the write head 60 of FIG. 6 will now be described in connection with FIG. 9. The method 400 is generally comprised of the following steps:

1. P1 formation (step 405);
2. mid-coat deposition and chemical mechanical polishing, or CMP (step 410);
3. coil formation (step 415);
4. coil probing (step 420);
5. coil insulation and curing (step 425);
6. back gap formation (step 430);
7. deposition of $Al_2O_3$ insulation and CMP (step 433)
8. adjunct pole electroplating (step 435);
9. deposition of insulation layer and CMP (step 440);
10. sputter deposition of high moment material (step 445); and
11. patterning of sputtered main pole (step 450).

Each of these steps will now described in more detail: The bottom pole P1, which is also referred to as the flux return layer 90, is fabricated by an electroplating process at step 405. In one embodiment, the bottom pole P1 can serve as a second shield for the read head of the read/write element 50.

The mid-coat deposition and chemical mechanical polishing (CMP) step is implemented at step 410, wherein an insulation layer of, for example, $Al_2O_3$ is sputter deposited onto the pole P1 (90). The wafer is then planarized by CMP process. A layer of $Al_2O_3$ is deposited on the bottom pole P1 (90), which serves as insulation between the write coil 94 and the bottom pole P1.

The write coil 94 is then formed at step 415, on the flat wafer surface, to achieve a narrow coil pitch. The coil fabrication process may be implemented by a conventional copper plating technique into photolithographically defined patterns, which is follows by the copper seed layer removal by means of a wet or dry etching process.

The resistance of the write coil 94 is the probed at step 420, to ensure acceptable yield. A photoresist insulation layer is deposited onto the coil 94 and subsequently cured.

The back gap 92 is then formed behind the write coil 94, by depositing a magnetic material to connect the bottom pole P1 and the adjunct pole 96, in order to provide a magnetic flux flow path.

A thick $Al_2O_3$ insulation layer is sputtered deposited onto the write coil 94 and the photoresist coil insulation at step 425. An insulation layer of cured photoresist may be necessary to fill the narrow space between the coil turns 94A before, depositing the $Al_2O_3$ insulation layer. Another CMP step may be necessary to planarize the wafer. Alternatively, the write coil 94 could be fabricated using a copper damascene technique, which starts with dielectric layer deposition, anisotropically etching of trenches, copper seed layer deposition by chemical vapor deposition, copper plating, and copper/dielectric layer CMP.

The adjunct pole 96 is then fabricated at step 435 by electroplating into pre-defined photolithography patterns. The adjunct pole 96 can be made, for example of NiFe or CoNiFe alloys. The forward edge 99 of the adjunct pole 96 is recessed from the ABS level by approximately 0.5 $\mu$m to 2.0 $\mu$m.

Subsequent to the electroplating and removal of the photoresist and plating seed, an insulation layer of $Al_2O_3$ is sputtered deposited onto the adjunct pole 96 at step 440 CMP step is then used to planarize the wafer, and thus expose the top surface of the adjunct pole 96. The insulation layer fills the recess 98, in preparation for the next step of forming the pole main pole 102, that is to support the pole tip 108 of the main pole 102.

At step 445, a high moment film of approximately 0.1 $\mu$m to 0.7 $\mu$m thick is sputtered deposited onto the flat wafer surface in order to form the main pole 102. At step 450, photolithography patterns are created on top of the sputtered film (step 445), and are used as masks during the etching process to define the main pole 102 structure. Photolithography techniques can also be utilized on the planar wafer surface. A hard mask layer may be used to improve the etching selectivity of the mask with respect to the high moment film. In this case, a separate etching step is needed to pattern the hard mask before patterning the main pole 102.

The method 500 for making the write head 70 of FIG. 7 will now be described in connection with FIG. 10. The method 500 is generally comprised of the following steps:

1. P1 formation (step 405);
2. mid-coat deposition and chemical mechanical polishing, or CMP (step 410);
3. coil formation (step 415);
4. coil probing (step 420);
5. coil insulation and curing (step 425);
6. back gap formation (step 430);
7. deposition of $Al_2O_3$ insulation and CMP (step 433)
8. sputter deposition of high moment material (step 535);
9. patterning of sputtered main pole (step 540); and
10. adjunct pole electroplating (step 545).

Each of these steps is similar or identical to those described earlier in connection with the manufacturing method of the write head 60 (FIG. 6). One main difference between the process 400 FIG. 6 and the alternate manufacturing process 500 of FIG. 7, is the order of the fabrication of the main pole 102 and the adjunct pole 96.

In the alternative method 500, the main pole 102 is fabricated before the adjunct pole 96. To this end, step 535, that is the sputter deposition of the high moment material, and step 540, that is the patterning of the sputtered main pole 102, precede the step 545 of forming the adjunct pole 96.

The write head of the present invention offers several advantages, among of which are the following:

The write head is capable of producing an approximately 7000 Oe write field in the medium at the narrow track width of approximately 0.1 μm;

the field gradient is much higher than in conventional longitudinal write heads;

The perpendicular write head design of the present invention has less sensitivity to fly height than conventional perpendicular write heads; and the perpendicular write head of the present invention has superior overwrite and NLTS performance.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment.

What is claimed is:

1. A thin film write head for magnetic recording, comprising:

a first pole (P1) made of a magnetically conductive material;

an inductive write coil disposed atop the first pole (P1);

a main pole for writing data onto the medium, that is formed over the write coil and that extends to an air bearing surface (ABS) level;

an adjunct pole made of a thin film magnetically conductive material and formed atop the main pole; and the adjunct pole includes a forward edge that is recessed from an air bearing surface (ABS) level.

2. The thin film write head of claim 1, wherein the main pole includes a tip that extends from the ABS level to a predetermined distance from the forward edge of the adjunct pole.

3. The thin film write head of claim 2, wherein the tip of the main pole has a generally square footprint.

4. The thin film write head of claim 3, wherein one side of the tip is equal to a track width of the medium.

5. The thin film write head of claim 1, wherein the main pole is made of a sputtered high moment magnetic material.

6. The thin film write head of claim 5, wherein the main pole has a thickness that ranges between approximately 0.1 μm and 0.7 μm.

7. The thin film write head of claim 5, wherein the sputtered high moment magnetic material has a magnetic moment that ranges between approximately 19 to 25 kGauss.

8. The thin film write head of claim 5, wherein the first pole (P1) extends from the ABS level to a back gap that connects the first pole P1 to the adjunct pole.

9. The thin film write head of claim 8, wherein the back gap is located rearward the write coil.

10. The thin film write head of claim 9, wherein the back gap is made of a magnetically conductive material.

11. The thin film write head of claim 5, wherein the forward edge of the adjunct pole is recessed from the ABS level by approximately 0.1 μm and 0.7 μm.

12. The thin film write head of claim 5, wherein the adjunct pole and the first pole (P1) have a substantially equal thickness.

13. A data storage system including a thin film write head for magnetic recording, the write head comprising:

a first pole (P1) made of a magnetically conductive material;

an inductive write coil disposed atop the first pole (P1);

a main pole for writing data onto the medium, that is formed over the write coil and that extends to an air bearing surface (ABS) level;

an adjunct pole made of a thin film magnetically conductive material and formed atop the main pole; and the adjunct pole includes a forward edge that is recessed from an air bearing surface (ABS) level.

14. A method of making a thin film write head for magnetic recording, comprising:

forming a first pole (P1) of a magnetically conductive material;

forming an inductive write coil atop the first pole (P1);

forming a main pole for writing data onto the medium, over the write coil, wherein the main pole extends to an air bearing surface (ABS) level;

forming an adjunct pole of a thin film magnetically conductive material, atop the main pole; and recessing the adjunct pole from the ABS level.

15. The method of claim 14, further including forming a back gap.

16. The method of claim 14, wherein the main pole includes a tip that extends from the ABS level to a predetermined distance from the forward edge of the adjunct pole.

17. The method of claim 16, wherein the tip of the main pole has a generally square footprint.

18. The method of claim 17, wherein one side of the tip is equal to a track width of the medium.

19. The method of claim 18, wherein the main pole is made of a sputtered high moment magnetic material.

* * * * *